United States Patent Office

3,461,110
Patented Aug. 12, 1969

3,461,110
PROCESS FOR PRODUCING POLYOLEFIN
POLYMERS
Billy D. Rice, Pasadena, and William P. Stadig, Houston,
Tex., assignors to Petro-Tex Chemical Corporation,
Houston, Tex., a corporation of Delaware
No Drawing. Filed June 2, 1965, Ser. No. 460,850
Int. Cl. C08f 1/32, 1/08
U.S. Cl. 260—93.7       16 Claims

ABSTRACT OF THE DISCLOSURE

Polymerization of an unsaturated hydrocarbon having the formula R—CH=$CH_2$, wherein R is selected from an alkyl radical having from 1 to 6 carbon atoms, a phenyl radical, and an alkyl substituted phenyl radical, in the presence of 0.01 percent to 10 percent by weight of a hydrocarbon additive having 3 to 5 carbon atoms, the additive being substantially inert to the unsaturated hydrocarbon and the catalyst.

---

This invention relates to a process and composition for producing polyolefins, and, in one of its aspects, relates to a process for producing polybutene in a substantially all-monomer system. In another aspect, the invention relates to a method for producing polybutene polymer having a narrow molecular weight distribution.

It is well known that certain alpha-olefins can produce marcromolecules having a molecular weight of hundreds of thousands or even of millions by a highly exothermic process initiated by free radicals, carbonium ions, or carbanion ions. A complete description of processes utilizing a complex metal alkyl catalyst can be found in the Ziegler et al. patent, U.S. 3,113,115, issued on Dec. 3, 1963. In this patent, as well as in the literature of Natta, the polymerization of monoolefins is conducted in the presence of large volumes of inert diluent or solvent, such as heptane, isooctane, benzene, or light petroleum fractions such as kerosene and the like. The use of from 60 to 95 volume percent of inert diluent is typical of the high volumes of inert diluent reported in the literature. According to the prior art, the use of substantial volumes of a solvent is essential if a high grade, commercially useable polymer is to be produced.

Although olefin polymerization has also been reported as being possible in the complete absence of a solvent, it is generally recognized that such reactions are uncontrollable, require expensive and complicated polymerization systems, and are, for the most part, commercially unfeasible. In addition, the polymers produced from such a reaction process possess a broad range of molecular weights and have little commercial value. For example, low molecular weight oily substances are produced which must be separated from the heavier solid polymer before the solid polymer can be extruded or molded. This reduces useable polymer yields and increases costs of production.

By the process hereafter described, it has been found quite unexpectedly that the disadvantages associated with a substantially all-monomer system are not only overcome, but numerous advantages are realized from its use thereof. One advantage is that in the absence of a heavy solvent, the monomer can be more easily separated from the polymer, thereby providing a convenient and simple means for separating the solid polymer from solutions or suspensions of polymer at low temperatures. Another advantage is that in an all-monomer system the unreacted monomer can be recycled to the reaction system without first separating the inert diluent from the monomer. Tubular expanders and other such devices for flashing or for vaporizing a volatile material at moderately low temperatures are particularly well adapted for use in an all-monomer system.

It is therefore a primary object of this invention to provide a composition and method for polymerizing particular monoolefins in an all-monomer system.

It is another object of this invention to provide a process for producing polybutene polymer having a narrow distribution of molecular weights.

Another object is to provide a polybutent polymerization composition and process which avoids the necessity of using expensive and complicated processing equipment for producing and separating solid polybutene polymer from a solvent.

Still another object of this invention is to provide an improved process for controlling the rate of polymerization as well as the molecular weight distribution of the polymer thereby produced.

These and other objects of the invention will become more readily apparent from the detailed description and discussion which follows.

It was unexpectedly found that the objects of this invention and the advantages of an all-monomer system can be achieved by adding a reaction controlling quantity of a hydrocarbon additive to a Ziegler type polymerization system. Preferably, the hydrocarbon additive will have a vapor pressure similar to that of the monomer being polymerized and will have a limited affinity as a solvent for the polymerized monomer. Hydrocarbons which are suitable for use in this invention include hydrocarbons and hydrocarbon compounds or mixtures thereof containing 3 to 5 inclusive carbon atoms. Hydrocarbons such as propane, butane, isobutane, pentane, isopentane and butene-2 can be used. When butene-1 is the monomer to be polymerized, butane, isobutane or butene-2 is the preferred hydrocarbon additive. The amount of hydrocarbon added will generally be limited to amounts of between 0.01 percent to 10 percent based on the weight of the monomer used. However, amounts of between 0.1 percent and 5 percent are preferred with amounts of between 0.1 to 3 percent being a narrower suitable range. Amounts in excess of 10 percent should be avoided as such increased amounts tend to decrease catalyst efficiency and are, for the most part, unnecessary.

The method of adding the hydrocarbon to the polymerization system is not particularly critical and can be added with the Ziegler catalyst or with the monomer or separately. Preferably, the hydrocarbon is combined with the Ziegler catalyst as the catalyst is combined with or added to the monomer in the polymerization system.

A variety of monomers may be polymerized in accordance with the process and composition of this invention. Any unsaturated hydrocarbon corresponding to the general formula, R—CH=$CH_2$, wherein R is selected from the group consisting of an alkyl radical having from one to six carbon atoms, a phenyl radical, and an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like. Unsaturated hydrocarbons containing 4 to 5 carbon atoms are especially suitable. Diolefins, such as butadiene and isoprene, and alkyl substituted ethylenic compounds having 6 to 8 carbon atoms, such as styrene, methylstyrene, and the like, may also be polymerized by the process of this invention. Mixtures of any of the above monomers can also be used.

The monomers may be polymerized at moderate temperatures and pressures with a catalyst obtained by admixing a strong reducing agent with a transitional metal compound wherein the metal is selected from Groups IVB, VB, and VIB of the Periodic System. Generally, the monomers are polymerized at temperatures ranging from 0° C. to 150° C., with temperatures in the order of about 25° C. to 80° C. being particularly useful.

The pressure ranges from about atmospheric pressure to about several atmospheres with pressures in excess of about 500 p.s.i. rarely being employed. The catalyst is simply prepared by mixing the various components whereupon an active catalyst is formed. If desired, the activated catalyst can be aged or otherwise further treated prior to use. For example, alkali metal halides, such as sodium chloride, potassium iodide, lithium bromide, or sodium fluoride, can be used as additives for improving catalyst efficiency and for controlling the length of the polymer chain.

The catalyst is normally prepared from a transitional metal compound, preferably a halide, and a reducing component consisting normally of a metal alkyl compound. Representative of the transitional metal compounds used is a metal selected from Groups IV–B, V–B, and VI–B of the Periodic System. Included in the preferred species are the titanium halides, for example, titanium tetrachloride, titanium trichloride, and titanium dichloride, and mixtures thereof. Other metal compounds, such as zirconium tetrahalide and hafnium tetrachloride, vanadium chloride, chromium chloride, tungsten chloride, and the like, are especially useful. Still other transitional metal halides containing halogens selected from the group consisting of bromine, iodine, chlorine, and, in certain instances, fluorine, can also be used.

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc diethyl hydride, and the like, are described in the literature as useful reducing agents and can also be used. These catalysts are all of the new well known "Ziegler" variety.

Certain Ziegler catalysts, or, more particularly, certain modified Ziegler catalysts, have been found to be especially useful for polymerizing alpha-olefins. For example, a titanium trichloride catalyst modified with aluminum chloride having the formula, $3TiCl_3 \cdot AlCl_3$, has been found to be particularly useful for polymerizing butene-1. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

For purposes of this invention, the transitional metal halide and the reducing component are present in molar ratios of about 1 to 1. However, molar ratios of the transitional metal halide and the reducing component can be present in mol ratios from as low as 0.1 to 1 to as high as 6 to 1. If $TiCl_3$ is the transitional metal halide and diethyl aluminum chloride is the reducing agent, an aluminum to titanium ratio of about 0.33 atom of aluminum per atom of titanium is preferably used.

It has been found that as the catalyst efficiency is increased, the amount of hydrocarbon additive which is required is reduced. For example, where the catalyst efficiency is 2000, that is, where 2000 pounds of polymer is produced per pound of catalyst, the hydrocarbon additive is generally present in a mol ratio of between 40 mols of hydrocarbon per mol of catalyst to about 85 mols of hydrocarbon per mol of catalyst. If a catalyst having a catalyst efficiency of about 4000 is used, the amount of hydrocarbon which is required can be reduced by about one-half. However, in no instance will the mol ratio of hydrocarbon additive to catalyst be less than 3 to 1 or greater than 750 to 1. Preferably, a mol ratio of between 30 mols of hydrocarbon per mol of catalyst and 150 mols of hydrocarbon per mol of catalyst is used.

The preferred catalyst composition for the polymerization of butene-1 in a substantially all-monomer system comprises a modified titanium trichloride having the structural formula, $3TiCl_3 \cdot AlCl_3$, activated with ethyl aluminum sesquichloride. Preferably, the ethyl aluminum sesquichloride and the modified titanium chloride materials are present in molar ratios of slightly less than two mols of ethyl aluminum sesquichloride per mol of titanium trichloride. Ratios of ethyl aluminum sesquichloride and titanium trichloride of between 0.3:1 and 6:1 may, however, be advantageously used. The presence of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

The low pressure polymerization processes are preferably conducted under conditions that exclude atmospheric impurities such as moisture, oxygen and the like.

After the polymer of this invention has been produced, the catalyst is deactivated by contacting the polymeric mixture with a material which reacts with and deactivates the catalyst. Such materials include, for example, lower alcohols, acetone, or water. Thereafter, the polymer may be separated from the diluent, washed with water to insure complete removal of the catalyst and the catalyst deactivator, and then dried. If the polymer is in solution, rather than as a suspension, the polymer can be separated from the monomer by precipitating the polymer from the monomer or, preferably, by flashing or fractionating the monomer from the polymer present therein. After the solid polymer has been obtained, the polymeric material may then be pelletized for conversion into useful articles, such as tubing, film, containers, and the like.

As previously stated, one of the advantages of this invention is that after the solid polymer is obtained, intricate separating and drying steps can be avoided. In an all-monomer system, there is no heavy solvent or diluent present and therefore does not require elaborate or extensive solvent removal systems for separating the monomer from the solid polymer produced.

The following examples are given by way of illustration and not limitation. In all of the examples, a five gallon vessel equipped with a reflux condenser, electric strip heaters, and a 3-blade propeller agitator and a thermowell located along the shaft of the propeller agitator was used. In each example, the reaction vessel was prepared by (1) thoroughly cleaning with an organic solvent, (2) purging same with a stream of hot, dry nitrogen gas, (3) flushing the reaction vessel by refluxing a 10 percent solution of ethyl aluminum sesquichloride in normal butane, and (4) flushing the reaction vessel with dry normal butane. The molecular weights that are reported in the examples to follow were determined by vapor pressure depression and by viscometery. The vapor pressure technique was used on low molecular weight materials, that is, up to 5,000, and the higher molecular weight materials were determined by the intrinsic viscosity technique. Both of these techniques are well known in the art and can be found in many texts on polymer chemistry.

EXAMPLE 1

The catalyst was prepared by mixing in the stainless steel vessel 0.313 mol of ethyl aluminum sesquichloride and one pound of Matheson Pure Grade butene-1 containing approximately 99.7 percent butene-1 and 0.3 percent isobutylene. To this mixture was added 0.202 mol of titanium chloride catalyst having the formula, $$3TiCl_3 \cdot AlCl_3$$

and 0.54 mol of powdered KCl. To this catalyst mixture was added 19 pounds of additional butene-1. The butene-1 catalyst mixture was thoroughly agitated and heated to a temperature of 40° C. at a pressure of 60 p.s.i. After 5 minutes of operation under reaction conditions, the temperature rose to 120° C. and a pressure of 340 p.s.i. After 20 minutes of operation, the temperature and pressure increased to a point where the reaction was completely uncontrollable. At this point, the reaction was stopped by quenching the catalyst, and the unreacted butene vapors were vented off. The polymer was then dissolved in normal heptane maintained at a temperature of 80° C. The polymer was then washed with a two percent aqueous oxalic acid solution followed by several distilled water washes. The polymer was recovered by steam stripping off the heptane. The polymer was then granulated, vacuum dried, and tested. The molecular weight distribution of the polymer produced ranged between about 5,000 to 2,500,000.

EXAMPLE 2

Example 1 was repeated with the exception that normal heptane was added to the butene-1 in an amount of about two weight percent. The polymer obtained had properties similar to those in Example 1.

EXAMPLE 3

This example was run to show the advantage which is obtained by using a small amount of a saturated hydrocarbon containing from 3 to 5 carbon atoms.

Example 1 was again repeated with the exception that two percent normal butane, instead of heptane, was added to the reaction system. The rate of reaction in this instance was controllable for a period of one hour without a significant rise in temperature. After one hour of reaction time, the catalyst was quenched and the polymer produced was tested. The molecular weight distribution of the polymer was found to be between about 150,000 to 500,000.

EXAMPLE 4

Example 2 was repeated with the exception that a 5 percent normal butane was added to the reaction mixture. The reaction temperature increased from 40° C. to 60° C. over a period of about 30 minutes. At all times, the rate of polymerization and heat of reaction was controllable. After the polymerization was complete, the polymer was tested and it was found that the molecular weight distribution of the polymer produced was within a range of about 100,000 to 750,000.

EXAMPLE 5

In this example, the conditions of operation as set forth in Examples 1 and 2 were repeated with the exception that an equal molar mixture of normal butane and butene-1 was used. After a reaction time of about two hours at a temperature of about 60° C., approximately 30 percent of the monomer was converted to a solid polymeric material and tested. It was found that the polymer contained a broader divergency of molecular weights than was found in Examples 3 and 4. Such polymer may require additional fractionation before it can be extruded.

EXAMPLE 6

Example 1 was repeated with the exception that the aluminum sesquichloride catalyst used in Example 1 was replaced with 0.19 mol of diethyl aluminum chloride. In this example, no saturated hydrocarbon was added. The polymer thereby produced was tested and was found to possess properties similar to those obtained in Example 1.

EXAMPLE 7

Example 3 was repeated with the exception that diethyl aluminum chloride was substituted for the aluminum sesquichloride used in Example 3. The reaction was run for one hour and eight minutes at a temperature of below 100° C. The polymer obtained was tested and was found to possess qualities similar to those obtained in Example 3. It was noted, however, that the use of diethyl aluminum chloride produced a more active catalyst than that obtained with aluminum susquichloride and required stricter controls in order to obtain a product of comparable quality.

EXAMPLES 8 AND 9

Examples 8 and 9 are essentially the same as those reported in Examples 1 and 3, respectively, except that in Examples 8 and 9, 3-methylbutene-1 was substituted for the butene-1. After about 30 minutes of operation, the polymers in both examples were examined, and it was found that the polymers produced in Example 9 had a much narrower range of molecular weights than the polymer produced in Example 8.

EXAMPLES 10 AND 11

Examples 10 and 11 are essentially the same as Examples 1 and 3, respectively, except that butadiene was substituted for the butene-1 monomer used in Examples 1 and 3. After approximately 30 minutes of operation, the catalyst was deactivated and the polymer examined in both examples. It was found that the polymer in Example 11 contained a narrower range of molecular weight distribution than the polymer produced in Example 10.

EXAMPLE 12

Examples 3 and 4 were repeated with the exception that n-pentane was substituted for the butane. The results obtained in this example were similar to those obtained Examples 3 and 4.

EXAMPLE 13

Comparative runs as set forth in Examples 1, 2 and 3 were made with 4-methyl pentene-1 at a temperature of about 60° C. A conversion of 58.1 percent to 4-methyl pentene-1 polymer having a narrow range of molecular weight distribution was obtained when a hydrocarbon additive having from 3 to 5 carbon atoms was used.

Good molecular weight distributions of polymers were also obtained using styrene or proplyene as the monomer.

From these above examples, it can be seen that unsaturated hydrocarbons selected from the group consisting of pyropylene, butene-1, 3-methyl butene-1, butadiene, 4-methyl pentene-1, and styrene produced polymers possessing highly desirable qualities.

We claim:

1. In a process for the preparation of solid polymer from an unsaturated hydrocarbon monomer corresponding to the formula R—CH=CH$_2$, wherein R is selected from the group consisting of an alkyl radical having 1 to 6 inclusive carbon atoms, a phenyl radical and an alkyl substituted phenyl radical in the presence of a catalytic amount of a Ziegler catalyst, at a temperature of from 0° C. to 150° C., and wherein the polymer produced is dissolved as prepared during the polymerization in the monomer, and later separated, the improvement comprising carrying out the polymerization of said unsaturated hydrocarbon in the presence of a hydrocarbon additive having 3 to 5 inclusive carbon atoms, said hydrocarbon additive being substantially inert to said unsaturated hydrocarbon monomer and catalyst, and being present in an amount of between 0.01 percent to 10 percent based on the weight of the unsaturated hydrocarbon monomer.

2. The process of claim 1 wherein the hydrocarbon additive is present in an amount of from 0.1 percent to 5 percent, based on the weight of the unsaturated hydrocarbon monomer.

3. The process of claim 2 wherein the Ziegler catalyst comprises a reduced titanium tetrahalide compound activated with an aluminum alkyl compound.

4. The process of claim 3 wherein the reduced titanium tetrahalide corresponds to the formula, $3TiCl_3 \cdot AlCl_3$, and said aluminum alkyl is selected from the group consisting of diethyl aluminum chloride and ethyl aluminum sesquichloride.

5. The process of claim 1 wherein the hydrocarbon additive is selected from the group consisting of propane, butane, butene-2, isobutane, pentane, isopentane, and mixtures thereof.

6. The process of claim 5 wherein the hydrocarbon additive is present in a mol ratio of hydrocarbon additive to catalyst of between 3:1 and 750:1.

7. The process of claim 6 wherein the unsaturated hydrocarbon monomer is 3-methyl-butene-1.

8. The process of claim 6 wherein the unsaturated hydrocarbon monomer is 4-methyl pentene-1.

9. In a process for the preparation of solid butene polymers from a butene-1 monomer in the presence of a catalytic amount of Ziegler catalyst, at a temperature of from about 25° C. to about 80° C., wherein the polymer produced is dissolved as prepared during polymerization in the monomer, and later separated, the improvement comprising carrying out the polymerization of said butene-1 in the presence of a hydrocarbon additive having from 3 to 5 inclusive carbon atoms, said hydrocarbon additive being substantially inert to said butene-1 and catalyst, and being present in an amount of between 0.01 percent to 10 percent based on the weight of said butene-1.

10. The process of claim 9 wherein the hydrocarbon additive is present in an amount of from 0.1 percent to 5 percent, based on the weight of the butene-1.

11. The process of claim 10 wherein the Ziegler catalyst comprises a reduced titanium tetrahalide compound activated with an aluminum alkyl compound.

12. The process of claim 11 wherein the reduced titanium tetrahalide compound corresponds to the formula, $3TiCl_3 \cdot AlCl_3$, and said aluminum alkyl is selected from the group consisting of diethyl aluminum chloride and ethyl aluminum sesquichloride.

13. The process of claim 12 wherein the hydrocarbon additive is selected from the group consisting of propane, butane, butene-2, isobutane, pentane, isopentane, and mixtures thereof.

14. The process of claim 11 wherein the Ziegler catalyst comprises a reduced tetrahalide compound corresponding to the formula $3TiX_3 \cdot AlX_3$, wherein X is selected from the group consisting of chlorine, bromine, and iodine, the aluminum alkyl compound is an alkyl aluminum sesquihalide, and an alkali metal halide selected from the group consisting of sodium chloride, potassium chloride, sodium iodide, potassium iodide, and mixtures thereof, said catalyst containing from 0.3 to 6 mols of alkyl aluminum sesquihalide per mol of said reduced titanium tetrahalide and from 0.5 to 10 mols of an alkali metal halide per mol of said reduced titanium tetrahalide.

15. The process of claim 11 wherein the Ziegler catalyst comprises 0.3 to 6 mols of ethyl aluminum sesquichloride per mol of reduced titanium tetrahalide, and from 0.8 to 5 mols of sodium chloride per mol of reduced titanium tetrachloride compound corresponding to the general formula, $3TiCl_3 \cdot AlCl_3$, and the butane is present in an amount of from 0.1 percent to 3 percent based on the weight of the butene-1 present.

16. The process of claim 13 wherein a mixture of butane and isobutane is employed, and the Ziegler catalyst additionally comprises sodium chloride.

References Cited
UNITED STATES PATENTS

| | | | |
|---|---|---|---|
| 3,251,819 | 5/1966 | Ketley | 260—93.7 |
| 3,147,239 | 9/1964 | Canterino et al. | 260—93.7 |
| 3,197,452 | 7/1965 | Natta et al. | 260—93.7 |
| 3,101,328 | 8/1963 | Edmonds | 260—93.7 |
| 3,002,961 | 10/1961 | Kirschner | 260—93.7 |
| 3,225,021 | 12/1965 | Erchak | 260—93.7 |
| 3,362,940 | 1/1968 | Edwards et al. | 260—93.7 |
| 3,331,826 | 7/1967 | Taluott | 260—94.2 |
| 3,324,098 | 6/1967 | Rice et al. | 260—93.7 |
| 3,247,157 | 4/1966 | Reed et al. | 260—93.7 |

JOSEPH L. SCHOFER, Primary Examiner

E. J. SMITH, Assistant Examiner

U.S. Cl. X.R.

260—80, 82, 84, 85, 88, 93, 94

PO-1050
(5/69)

UNITED STATES PATENT OFFICE
CERTIFICATE OF CORRECTION

Patent No. 3,461,110　　　　　　　　　Dated　August 12, 1969

Inventor(s)　Billy D. Rice and William P. Stadig

It is certified that error appears in the above-identified patent and that said Letters Patent are hereby corrected as shown below:

Col. 3, line 38, "Zinc diethyl hydride" should be changed to --- zinc ethyl hydride ---.

SIGNED AND
SEALED
FEB 17 1970

(SEAL)
Attest:

Edward M. Fletcher, Jr.
Attesting Officer

WILLIAM E. SCHUYLER, JR.
Commissioner of Patents